May 19, 1964 A. J. WILTSHIRE ETAL 3,133,684
MAT FEATHERING APPARATUS
Filed March 27, 1961 7 Sheets-Sheet 1

INVENTORS
*Arthur J. Wiltshire*
*Richard C. Brussee*
BY *Ely, Pearne &*
*Gordon* ATTORNEYS

May 19, 1964  A. J. WILTSHIRE ETAL  3,133,684
MAT FEATHERING APPARATUS
Filed March 27, 1961  7 Sheets-Sheet 2

INVENTORS
Arthur J. Wiltshire
Richard C. Brussee
BY
ATTORNEYS

May 19, 1964　　A. J. WILTSHIRE ETAL　　3,133,684
MAT FEATHERING APPARATUS
Filed March 27, 1961　　　　　　　　　　　　7 Sheets-Sheet 5

INVENTORS
*Arthur J. Wiltshire*
*Richard C. Brussee*
BY
ATTORNEYS

May 19, 1964 A. J. WILTSHIRE ETAL 3,133,684
MAT FEATHERING APPARATUS
Filed March 27, 1961 7 Sheets-Sheet 7

INVENTORS
Arthur J. Wiltshire
Richard C. Brussee
BY
ATTORNEYS

United States Patent Office 3,133,684
Patented May 19, 1964

3,133,684
MAT FEATHERING APPARATUS
Arthur J. Wiltshire, Cleveland, and Richard C. Brussee, East Cleveland, Ohio, assignors to Structural Fibers, Inc., Chardon, Ohio, a corporation of Ohio
Filed Mar. 27, 1961, Ser. No. 98,617
20 Claims. (Cl. 225—101)

The present invention relates generally to the preparation of fiber matting for use in the manufacture of a wide variety of fiber-reinforced plastic articles, such as molded plastic sheets, tubes, containers and tanks, which are fabricated by laying up porous, fibrous mats approximately in the shape of the article to be produced and impregnating the fibrous matting shapes with a liquid resin which is thereafter cured or set to achieve a molded substantially homogeneous structure.

This invention is particularly concerned with the production of fiber-reinforced plastic pressure vessels and tanks, such as domestic water softener tanks and hot water tanks, which are subjected to pressures of considerable magnitude and are thus required to have a high bursting strength. Accordingly, the main objective of the invention is to provide apparatus which facilitates the fabrication process generally described above in a manner which makes it possible to manufacture seamless, leakproof tanks and similar articles of unexpectedly improved strength.

A more specific and preferred procedure which may be employed for fabricating articles of the type described is generally set forth in the copending application of Arthur J. Wiltshire, Ser. No. 63,082, filed October 17, 1960, and includes the steps of wrapping a plurality of superimposed, flat sheeting mats a single turn around an expandable mandrel to form a multi-layer cylindrical matting form. The flat sheeting mats used in this process are preferably constructed of randomly distributed, chopped glass fibers of substantially uniform length which are bonded together by suitable cured binders to form a porous, fibrous mass. Mats of this type are well known in the art and are commercially available. In accordance with the practice described in the above-identified copending application, the wrapped sheets of matting have a length substantially equal to the circumference of the finally molded tank and have opposite end edges correspondingly feathered or beveled in parallel planes from opposite sides of the mats, each mat being wrapped around the mandrel so that one feathered end edge loosely overlaps the body of the mat adjacent the other feathered end edge.

Having layed-up the fibrous sheets or mats around the mandrel in the foregoing manner, the mandrel is axially positioned within an open-end cylindrical mold casing and then expanded to position and compress the cylindrical matting form against the inner surface of the mold casing. As this expansion of cylindrical matting form takes place, the overlapped ends of each mat are drawn apart until the feathered end edges slide into matting juxtaposition so that the fibers of the matting are uniformly distributed and compacted over the inner mold surface. Thereupon, the mandrel is contracted and removed from within the mold casing and is replaced by a fluid expandable bag having an expanded shape conforming to the desired shape of the molded tank. Alternatively, the expandable mandrel can be left in place and used as a substitute for the inflatable bag.

As disclosed in the above-identified Wiltshire application, the next step in molding closed-end tanks has been to telescope preformed fiber matting pieces or caps into the upper and lower ends of the positioned, cylindrical matting form. The open-end casing is then closed by mold casing caps having the general configuration of the preformed fiber matting pieces or caps. With the matting forms and bag thus assembled within the closed mold, the bag is initially expanded to bring it into contact over its entire surface with the inner surface of the layed-up fiber forms. Liquid resin, which may be any resin settable by heat, a catalyst, or both, is then introduced into the bottom of the mold and caused to permeate the fiber matting forms. The bag is subsequently expanded by further inflation to progressively compress the fiber matting forms in such a manner as to distribute the resin throughout the matting and express resin from the mold, whereupon the resin is set or cured while maintaining maximum bag pressure. The resulting, finished molded article is a substantially closed, hollow tank of the character described and claimed in the copending application of Donald W. Randolph, Ser. No. 704,028, now Patent No. 3,010,602.

As described in the above-identified Randolph application, the molded tanks are usually formed with a thickened side wall portion which may be drilled and tapped to facilitate connection of the tanks to pipes and other fittings. The thickened wall portions of the tanks have been produced by layed up superimposed, rectangular pads of fibers within the cylindrical matting form on a portion of its inner side wall surface prior to the step of impregnating it with resin. The fiber pads, which also are subsequently impregnated with resin, become an integral part of the molded tank when the resin has been cured under pressure.

It has been found that, when a discontinuity exists in the molded article, as for example, between the longitudinal edges of the cylindrically wrapped matting form and/or between the ends of the cylindrical matting form and the fiber end caps, the strength of the tank is adversely affected. One reason for this detrimental effect is thought to be that the fiber-resin ratio in the areas of the discontinuities is less than in other portions of the article. As a result, a resin-rich and structurally weak region is created which is subject to leakage and failure. Another reason is thought to be that, when the discontinuities are formed by overlapped mat edges, the edges create stress risers which result in premature failure. This latter defect has been exhibited by water softener tanks which are normally subjected to fluctuating internal pressures. Such tanks have been found to fail in circumferential zones located at the points where the fiber end caps were telescoped into the ends of the cylindrical matting forms and then repeatedly expanded radially outwardly over the end edges of the matting forms by the pressure variations in the tanks.

Similar defects occur when the rectangular pads used to thicken the side walls of the tanks are formed with sharp edges. In such instances, the pads frequently delaminate from the tank walls and/or the tank walls fracture around the pads. These defects can be attributed to the fact that the thickened wall portions have a different rate of expansion than the thinner wall portions of the tanks. As a result, fluctuation of internal tank pressures and resultant flexing of the tank walls causes the pads to pull away from the tank walls and the walls to crack around the pads, thereby producing leaks.

In order to overcome the foregoing difficulties, it has been found advantageous to bevel or feather mating edges of the fibrous mats so that they blend into each other instead of creating a sharp line of demarcation and a resultant seam in the molded article. This practice is illustrated in the above-identified Wiltshire application wherein the longitudinal edges of the mats making up the wrapped cylindrical form are feathered so that the edges of each mat blend into each other when the matting form is positioned and compressed against the inner mold surface. In a similar manner, the top and bottom edges of the cylindrical matting form are feathered to cooperate with feathered edges of the fiber end caps in forming a seamless structure. It has also been found advantageous to feather all four edges of the rectangular pads used to thicken the tank side walls so that the edges of the pads blend into each other and into the walls of the tanks.

A more specific object of the present invention is to provide apparatus for feathering the edges of porous, fibrous mats to facilitate the improved fabricating process described above.

Another object of the invention is to provide apparatus for pulling mat sections of variable length from a strip of fibrous matting material and to simultaneously uniformly feather the pulled apart edges of the matting material.

Still another object of the invention is to provide apparatus for uniformly feathering the longitudinal side edges of mat sections which have been pulled from a strip of fibrous matting material.

As noted above, the matting material which is used in the fabrication of fibre-reinforced articles of the type described consists of a mass of randomly distributed fibers of substantially uniform length. In accordance with the present invention, apparatus is provided which includes cooperating clamps, each of which has relatively movable platens for grippingly engaging the matting material to be pulled apart. The clamps are relatively movable from a clamping position of parallel, spaced adjacency in which the clamps are spaced apart a distance slightly exceeding the fiber length of the material to a second position in which the clamps are spaced farther apart. Relative movement of the clamps from the clamping position to the second position is effective to pull apart the matting material between the clamps.

The novel construction of the apparatus comprising the invention is such that the clamps grip the matting material with a uniform clamping pressure. Because of this construction, the pulled apart edges of the matting will be uniformly feathered when the clamps are separated from each other.

The invention also includes means for positioning the matting material between the clamps to thereby facilitate an economical and easily accomplished feathering operation. In certain embodiments of the apparatus, this positioning means also is operative to automatically feed the matting material to the clamps between each feathering or pulling cycle.

Other objects and advantages of the invention will become apparent from the following detailed description and the accompanying drawings.

*Apparatus for Feathering Ends of Mats*

Reference is first made to FIGS. 1–8 which illustrate a preferred apparatus for pulling apart a strip of matting constructed of chopped glass fibers of substantially uniform length into sections having uniformly feathered or beveled pulled-apart edges. In operation, this apparatus may be used for the dual purpose of forming matting sections of the proper size to be wrapped into cylindrical form for the previously described fabricating process and for feathering the end edges of the matting sections which form the tops and bottoms of the cylindrical forms. The apparatus also may be used to form strip-like sections which are subsequently sub-divided into rectangular pads by another embodiment of the invention to be hereinafter described.

Figure 1:
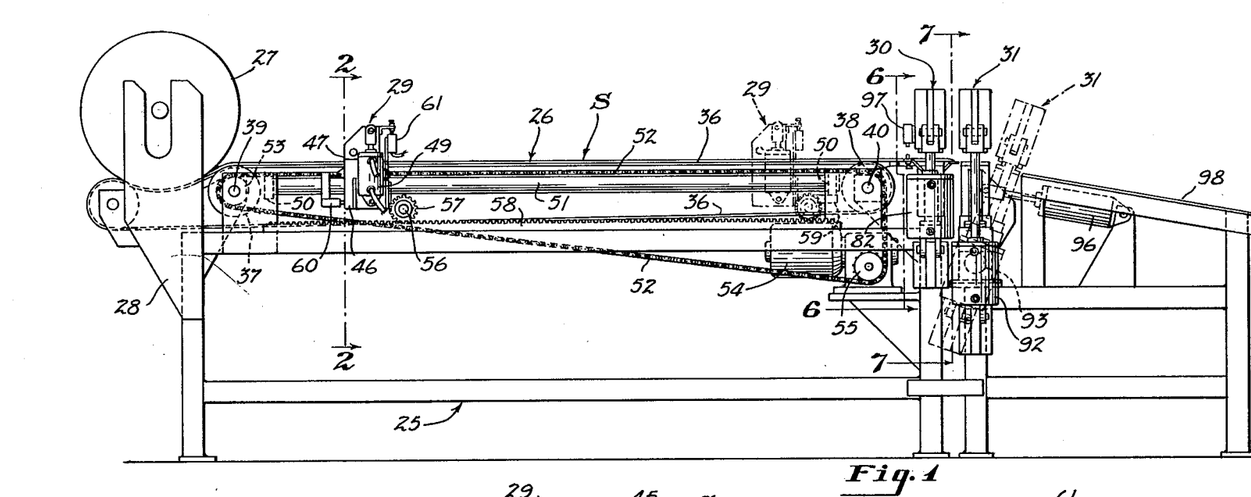
FIGURE 1 is a side elevational view of a preferred embodiment of the apparatus comprising the present invention.

As shown in FIG. 1, the apparatus for forming mat sections having feathered, pulled apart end edges is comprised generally of a frame 25 having a bed 26 for supporting a strip of matting fed from a supply roll 27 which is mounted at one end of the bed by the brackets 28. A feeding clamp 29 is slidably connected to the frame 25 for feeding the matting from the roll 27 to a pair of clamps 30 and 31 connected to the frame at the other end of the bed 26.

The clamp 30 is fixedly secured to the frame 25 and functions to clamp and hold the matting strip fed to it by the feeding clamp 29. The clamp 31 is pivotally connected to the frame adjacent the clamp 30 and is movable from a clamping position (shown in solid line position in FIG. 1) in which the clamps 30 and 31 are in parallel, spaced adjacency to a second position (shown in dot-dash outline in FIG. 1) in which the clamps are spaced farther apart. Movement of the clamp 31 from its clamping position to its second position is effective to pull apart the matting strip between the clamps and to uniformly feather the pulled apart edges.

Figure 2:
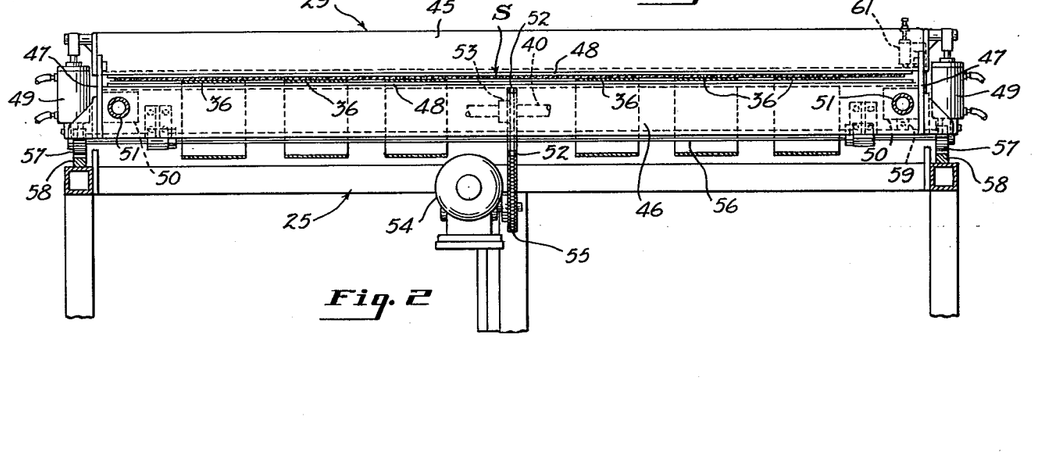
FIGURE 2 is a vertical sectional view taken along the line 2—2 of FIG. 1.
Figures 3, 8:
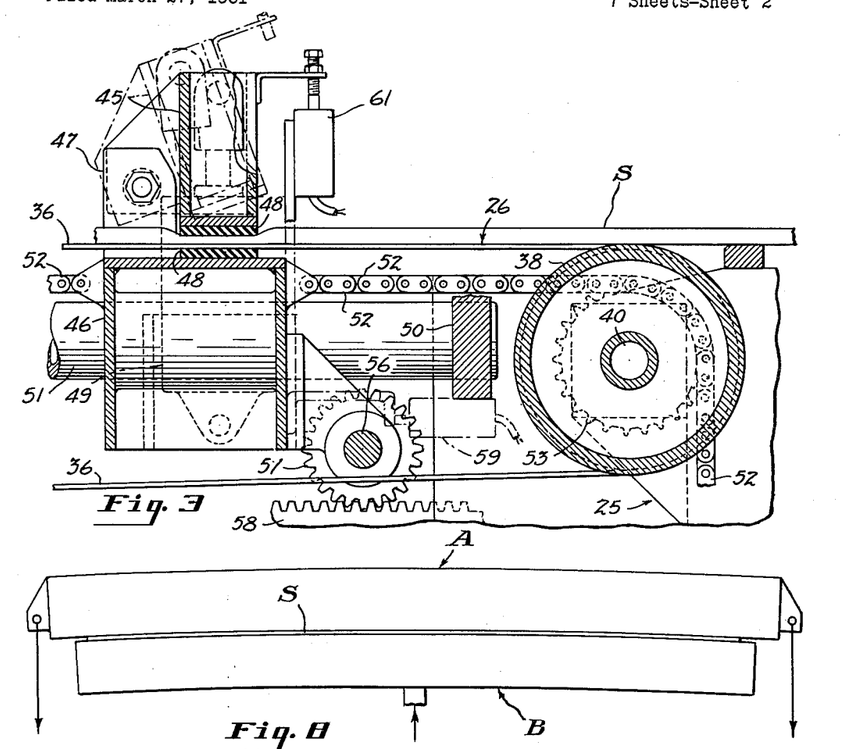
FIGURE 3 is a fragmentary, side elevational view in cross-section of a portion of the apparatus illustrated in FIG. 1.
FIGURE 8 is a diagrammatical, elevational view of a portion of the apparatus of FIG. 1.
Figures 4, 5, 9:
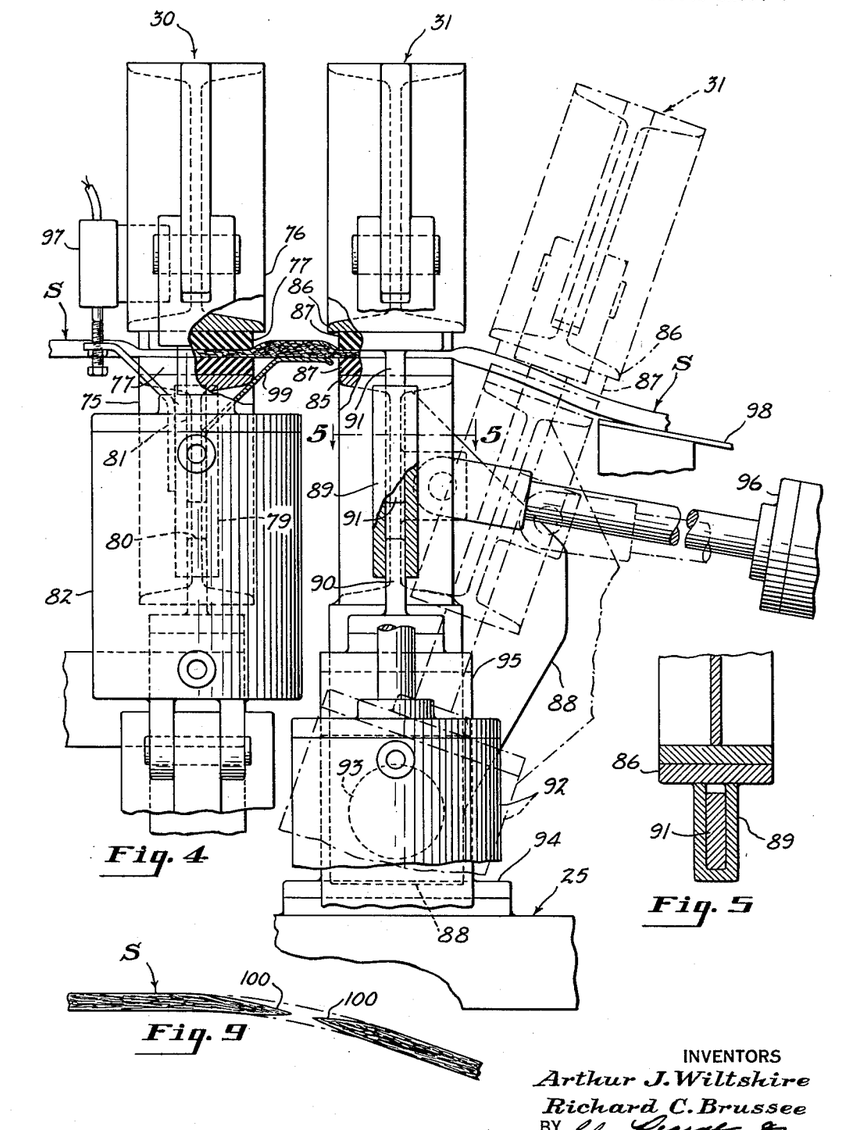
FIGURE 4 is another fragmentary, side elevational view in cross-section showing another portion of the apparatus illustrated in FIG. 1.
FIGURE 5 is a cross-sectional view taken along the line 5—5 of FIG. 4.
FIGURE 9 is a fragmentary, cross-sectional edge view of a pulled-apart strip of fibrous matting material.

Having thus described the general construction and operation of the apparatus, reference is next made to FIGS. 1, 2 and 3 which show the details of the bed 26 and the feeding clamp 29.

In the illustrated form of the apparatus, the bed 26 comprises a plurality of endless belts 36 which have their upper surfaces in a horizontal plane. The belts 36 are shown as being horizontally spaced from each other and as being mounted around a belt roller 37 which is adjacent and below the supply roll 27 and a corresponding roller 38 adjacent the clamp 30. Both rollers are freely rotatable on the shafts 39 and 40, respectively, which are mounted on the frame 25.

The feeding clamp 29 is formed by an upper platen 45 and a lower platen 46 which are movable toward and away from each other. The lower platen 46 extends from one side of the frame 25 to the other between the upper and lower passes of the belts 36, and has secured to each end a plate 47 which projects upwardly above the belts. As shown most clearly in FIG. 3, the upper platen 45 is pivotally connected to these plates 47 so that it may be rocked toward the lower platen 46 to clamp the strip S therebetween. Preferably, the cooperating clamping surfaces of the platens are provided with soft rubber pads 48 so that the glass fibers of the strip will not be broken.

Rocking movement of the upper platen 45 is effected by the double-acting fluid cylinders 49. Each of the cylinders 49 is secured to an end of the lower platen 46 and has its piston rod connected to the upper platen 45.

The ends of the lower platen 46 are provided with bearing blocks 50 which slidably support the entire feeding clamp on the bars 51 which extend along the sides of the frame 25. Sliding movement of the feeding clamp 29 along the bars 51 is effected by a chain 52 which has one end connected to the front surface of the lower platen 46 and its other end connected to the rear surface of the lower platen. The chain 52 is engaged around sprocket gears 53 fixed to the shafts 39 and 40 and is driven by a reversible motor 54 which is mounted on the frame 25 below the shaft 40 and which drives another sprocket gear 55 also engaged with the chain.

In order to prevent the feeding clamp 29 from cocking as it is slid along the bars 51, it is provided with a shaft 56 which is rotatably connected to the front of the lower platen 46. A rack gear 57 is fixed on each end of the shaft 55 and these rack gears cooperate with racks 58 mounted on the frame 25 below the bars 51.

The fluid cylinders 49 and the motor 54 are in circuit relation with a pair of limit switches 59 and 60 mounted on one of the bars 51 and with a limit switch 61 operatively mounted between the platens 45 and 46. The switches 59 and 60 are respectively located in front and in back of the feeding clamp 29 so that they will be alternately actuated when the feeding clamp reaches the end of its travel in one direction. The switch 61 is mounted on the feeding clamp so that it will be closed when the upper platen is rocked into clamping position.

In operation the fluid cylinders 49 are actuated to clamp the matting strip S and the belts 36 between the platens 45 and 46 when the feeding clamp is in its rear position shown in FIG. 1. This clamping action closes the limit switch 61 which starts the motor 54. The motor 54 operates to pull the feed clamp forwardly until it is in the dot-dash position illustrated in FIG. 1. Forward movement of the feed clamp serves to feed the strip S toward the clamps 30 and 31.

When the feed clamp reaches its forward position, the switch 59 is contacted and closed. This stops the motor 54 and causes the fluid cylinders 49 to be actuated to open the feed clamp 29 and the switch 61. Thereupon the motor 54 is actuated to reverse the movement of the feed clamp and draw it back to its rear position.

Reverse movement of the feed clamp brings it into contact with the switch 60 which, when closed, again stops the motor 54. Closure of the switch 60 also is effective to again actuate the cylinders 49 so that the strip S and the belts 36 are clamped between the platens 45 and 46, thus completing one cycle of operations and initiating the next cycle.

In the illustrated embodiment of the apparatus, the limit switch 59 is adjustably connected to the bars 51 so that the amount of travel of the feed clamp 29 can be varied. Thus, when pulling mat sections which are to be layed-up to form the cylindrical bodies of pressure tanks, the limit switch 59 can be adjusted toward or away from the limit switch 60 so that the feed clamp 29 moves a distance in one direction substantially equal to the length of the tanks to be formed. Alternatively, the switch 59 can be moved relatively close to the switch 60 so that the feed clamp will move only a short distance. As will be made more apparent, this limited travel of the feed clamp results in a short, strip-like section being pulled from the matting strip S.

Reference is now made to FIGS. 4-8 which show the detailed construction of the clamps 30 and 31.

Each clamp 30 and 31 respectively includes a lower platen 75 and 85 and an upper platen 76 and 86. The upper platens are only slightly longer than the lower platens and are movable toward the lower platens to clamp the strip S which is positioned therebetween by the feed clamp 29. The clamps 30 and 31 are preferably provided with soft rubber pads 77 and 87, respectively, on the clamping faces of the upper and lower platens to avoid damaging the glass fibers of the matting strip.

Figure 6:
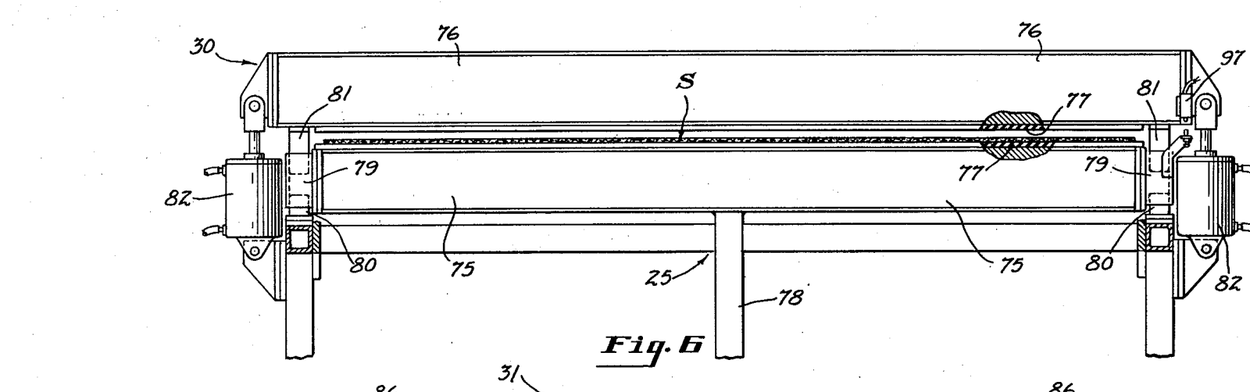
FIGURE 6 is a vertical, cross-sectional view taken along the line 6—6 of FIG. 1.

As shown most clearly in FIG. 6, the lower platen 75 of the clamp 30 is rigidly connected at its center to the frame 25 by a brace 78. The ends of the lower platen 75 are provided with knife guides 79 for guidingly receiving the blades 80 which are secured to the sides of the frame 25 to extend into the bottoms of the guides. The upper platen 76 is provided with oppositely extending blades 81 which are guidingly received in the tops of the guides 79.

Movement of the upper platen 76 toward and away from the lower platen 75 is effected by double-acting piston-cylinder mechanisms 82. In the illustrated construction of the apparatus, the cylinders of the mechanisms 82 are fastened to the sides of the frame 25 and their piston rods are fastened to the ends of the upper platen 76. When the piston-cylinder mechanisms 82 are actuated to draw the upper platen 76 downwardly into clamping cooperation with the lower platens 75, the ends of the lower platen will deflect downwardly and the blades 80 will move upwardly in the guides 79. At the same time, the ends of the upper platen will be correspondingly deflected or bowed with the blades 81 moving downwardly in the guides 79.

Figure 7:
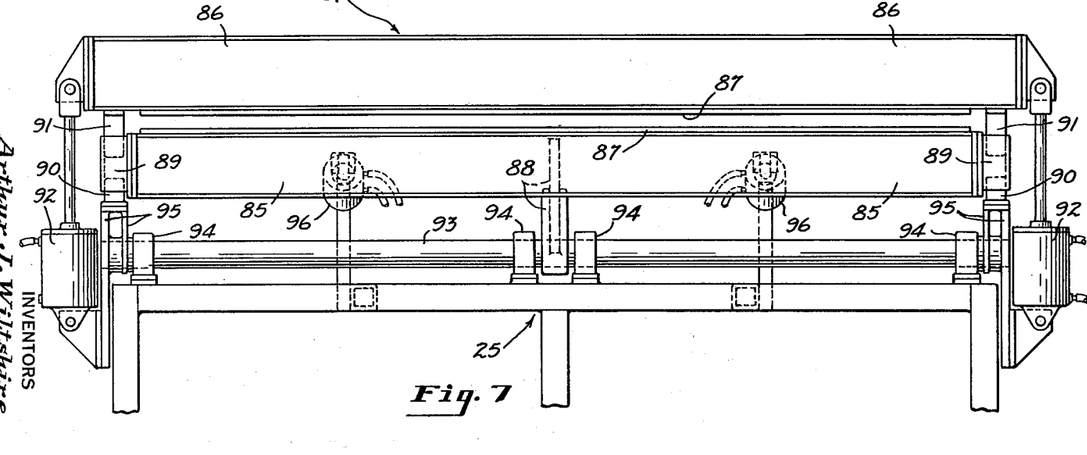
FIGURE 7 is a vertical, cross-sectional view taken along the line 7—7 of FIG. 1.

Referring particularly to FIG. 7, it will be seen that the lower platen 85 of the clamp 31 is pivotally connected at its center to the frame 25 by a brace 88 which is fixed on the pivot shaft 93. This shaft 93 is coextensive with the lower platen and is supported by bearing blocks 94 which are mounted on the frame 25.

At each end of the shaft 93 is fixed a plate 95. These plates carry double-acting piston-cylinder mechanisms 92 which have their piston rods fastened to the ends of the upper platen 86 for moving it toward and away from the lower platen 85. When the piston-cylinder mechanisms 92 are actuated to draw the upper platen 86 into clamping cooperation with the lower platen 85, the ends of both platens will be bowed downwardly in the manner discussed in connection with the clamp 30. The ends of the platens are guided for this deflecting movement by knife guides 89 which are secured to the ends of the lower platen. These guides 89 guidingly receive blades 90 which are secured to the top surfaces of the plates 95 and opposed blades 91 which extend downwardly from the upper platen 86 into the top ends of the guides.

As has been previously described, the clamp 31 is pivotally movable from a clamping position of parallel, spaced adjacency to the clamp 30 to a position in which the clamps are spaced farther apart. In its clamping position shown in FIG. 4, the clamp 31 is spaced from the clamp 30 a distance slightly exceeding the uniform fiber length of the matting strip S so that it is impossible for the clamps 30 and 31 to clamp the ends of the same fiber. In its pivoted position shown in dot-dash outline in FIG. 4, the platens of the clamp 31 are adjacent a sloping table 98 which forms part of the frame 25.

Pivoting movement of the clamp 31 is accomplished by a pair of double-acting piston-cylinder mechanisms 96. As shown most clearly in FIGS. 1 and 7, the cylinders of the mechanisms 96 are pivotally connected to the frame 25 below the table 98. The piston rods are pivotally connected to the front face of the lower platen 85.

A limit switch 97 (FIGS. 1 and 4) is mounted on the clamp 30 in a position to be closed when the upper platen 76 is moved into clamping cooperation with the lower platen 75. This limit switch 97 is in circuit relation with the reversible motor 54 which drives the feed clamp 29 and with the piston-cylinder mechanisms 96. The previously described limit switch 59 is in circuit relation with the piston-cylinder mechanisms 82 and 92, and the limit switch 60 is in circuit relation with the piston-cylinder mechanisms 82, 92 and 96.

In operation the closing of the switch 59 by the feed clamp actuates the cylinders 82 and 92 to clamp the strip S between the platens 75 and 76 and 85 and 86 of clamps 30 and 31, respectively. The clamping action of the clamps 75 and 76 closes the switch 97 which actuates the motor 54 to drive the feed clamp 29 toward the rear end of the frame 25. Closing the switch 97 also actuates the cylinders 96 to separate the clamps 30 and 31.

When the feed clamp 29 reaches the rear end of the frame and closes the switch 60, the cylinders 82 and 92 are actuated to unclamp the strip S. Closing the switch 60 also actuates the cylinders 96 to pivotally move the clamp 31 back to its clamping position of parallel, spaced adjacency to the clamp 30.

A particularly significant feature of the described apparatus is the construction of the clamps 30 and 31 which permits the clamps to apply a uniform clamping pressure across the width of the strip S. In order to accomplish this objective of uniform clamping pressure, the upper and lower platens of each clamp have been constructed as hereinafter described to have identical deflection curves under uniform loading.

It will be observed that each of the upper platens 76 and 86 constitutes a simple beam (i.e. a beam supported only at its ends) and that each of the lower platens 75 and 85, which are supported only at their centers, constitutes a pair of propped cantilever beams. It is known that the maximum deflection of a simple beam may be found from the formula $$\frac{WL^3}{384EI}$$

where W is the loading; L the beam length, E the modulus of elasticity, and I the movement of inertia. The maximum deflection of the free end of a propped cantilever beam may be found from the formula $$\frac{WL^3}{8EI}$$

In the illustrated construction where W and L of the lower beams are approximately one-half that of the upper beams, the formula for maximum end deflection becomes $$\frac{WL^3}{128EI}$$

By equating the formulas for maximum deflection, it will be found that, when the beams have the same modulus of elasticity, the beams will have equal deflection when the moment of inertia of the lower beam is 0.60 that of the upper beam. In the preferred construction of the clamps 30 and 31, the desired ratio of moments of inertia has been achieved by using 6-inch I-beams as the lower platens and 7-inch I-beams as the upper platens.

FIGURE 8 diagrammatically illustrates the cooperation of the upper and lower platens of the clamps 30 and 31 in clamping the strip S therebetween. As there shown when the upper beam A is uniformly loaded in the direction indicated by the arrows and is pulled into cooperating clamping position with the lower beam B, both beams will have identical deflection curves. As a result, the clamping pressures exerted by the beams will be uniform across their clamping surfaces. It has been found that a clamping pressure of about 20 psi is sufficient to hold the fibers of the strip S without slipping from between the clamps when the clamp 31 is pivoted away from the clamp 30 and without crushing the glass fibers.

The advantages of the foregoing clamp construction will be more apparent by considering the effect of clamping the strip S against a rigid surface while pulling the strip into sections. It will be apparent that, if an upper platen were pulled by its ends into clamping cooperation with a rigid surface, the center of the platen would bow away from the surface. As a result, the clamping pressure at the ends of the platen would be greater than at its center. When a fibrous strip is attempted to be pulled apart under this unequally distributed clamping pressure, the fibers will slip beneath the center of the platen rather than pulling apart, thus causing the strip to wrinkle or pucker at its center. If it were attempted to pull the upper platen down with enough force to overcome the fiber slippage near its center, the glass fibers under the ends of the platen would be crushed.

The combined operation of the apparatus will be largely apparent from the foregoing detailed description of its elements and their functions. In summary, the limit switches 59 and 60 are adjustably spaced relative to each other a distance equal to the length of matting desired to be pulled from the fibrous strip S. With clamps 30 and 31 open and in their clamping position of parallel, spaced adjacency, the feed clamp 29 is closed and the motor 54 is actuated to draw the feed clamp toward the front of the frame. Assuming that this feeding operation is started when the end of the strip S is between the clamps 30 and 31, the strip will be fed forwardly between the clamps an amount equal to the desired length of matting to be pulled from the strip. An upwardly projecting guide plate 99 (FIG. 4) fastened to the front of the platen 75 prevents the end of the strip S from dropping between the clamps 30 and 31 and guides the strip between the platens 85 and 86.

When the feed clamp 29 reaches the end of its travel in a forward direction, the clamps 30 and 31 are closed and the motor 54 is momentarily stopped. Thereupon the clamp 31 is pivoted away from the clamp 30. Because of the uniform clamping pressure exerted by both clamps, the randomly distributed fibers of the strip S will be pulled apart between the clamps along a line transverse to its sides. This pulling apart of the randomly distributed fibers results in the pulled apart edges 100 being uniformly feathered, as diagrammatically illustrated in FIG. 9.

Figure 10:
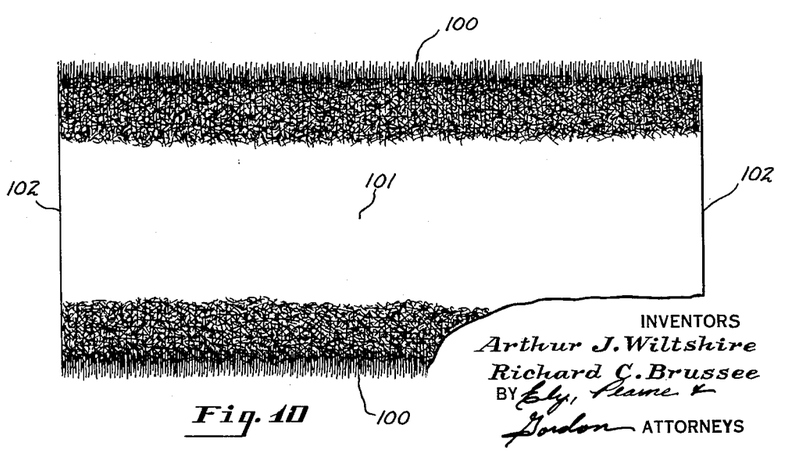
FIGURE 10 is a plan view of a matting section which has been pulled by the apparatus of FIG. 1.

When the clamp 30 is closed, the feed clamp 29 is opened and it is drawn toward the rear of the frame until it closes the switch 60. Thereupon the feed clamp is stopped and again closed and a new feeding cycle is started. Each such alternate feeding and pulling cycle results in a section of mat being pulled from the strip S. FIGURE 10 diagrammatically illustrates one such mat section 101 having the feathered end edges 100.

*Apparatus for Feathering Sides of Mat Sections*

Figure 11:
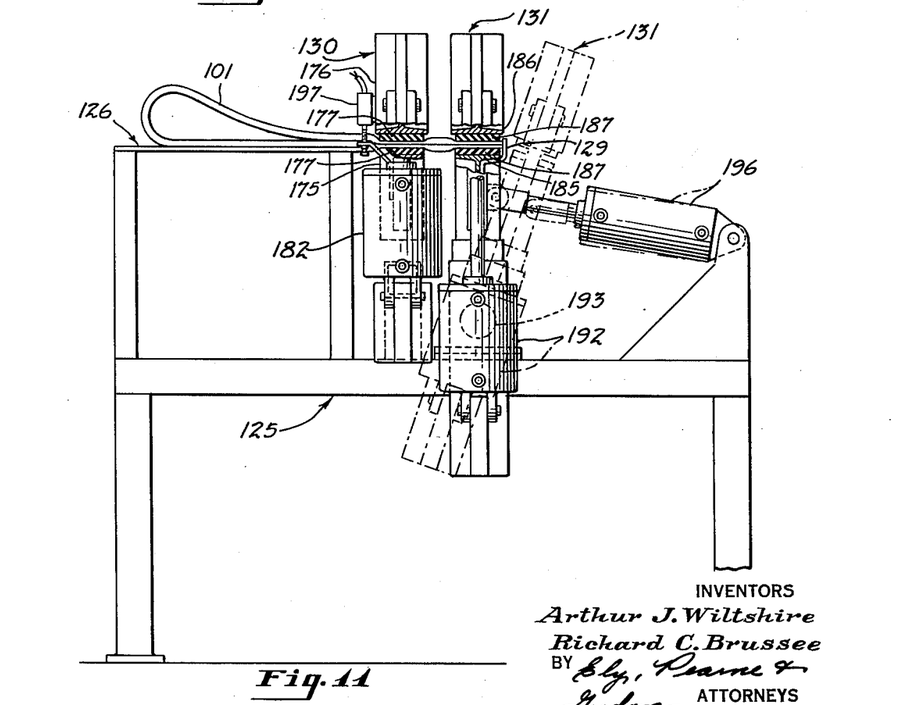
FIGURE 11 is a side elevational view, partially in cross-section, of another embodiment of the apparatus comprising the present invention.

Reference is now made to FIG. 11 which illustrates a modified form of the apparatus shown in FIGS. 1–8. This embodiment of the preferred apparatus is particularly useful in feathering the side edges 102 of the previous pulled mat sections 101 (FIG. 10).

The alternative embodiment of the invention shown in FIG. 11 is comprised of a frame 125 having a mat supporting bed 126 at one end thereof. A fixed clamp 130 and a pivoted clamp 131 are connected to the frame 125 near one end of the bed 126.

The clamps 130 and 131 are identical in construction to the clamps 30 and 31 discussed in connection with FIGS. 1–8 and, therefore, have not been shown in detail. Each clamp 130 and 131 will be understood, however, to respectively consist of lower platens 175 and 185 and upper platens 176 and 186. The upper platens 176 and 186 are simple beams which are uniformly loaded and pulled into clamping cooperation with the lower platens by the piston-cylinder mechanisms 182 and 192, respectively. The lower platens 175 and 185 are formed by beams which are supported only at their centers and have deflection curves identical to the upper platens under uniform loading. The clamps 130 and 131 are preferably provided with soft rubber pads 177 and 187, respectively, on their clamping faces to avoid damage to the glass fibers of the mat section 101.

As in the case of the previously described clamp 31, the clamp 131 is fixed on a pivot shaft 193 which corresponds to the shaft 93 shown in FIG. 7. This shaft 193 is coextensive with the lower platen 185 and is supported by bearing blocks (not shown) which are mounted on the frame 125. The clamp 131 is pivotally movable from a clamping position shown in FIG. 11 of parallel, spaced adjacency to the clamp 130 to a second position (shown in dot-dash outline in FIG. 11) in which the clamps are spaced farther apart.

Pivoting movement of the clamp 131 is effected by a pair of piston-cylinder mechanisms 196 (only one of which is shown) which correspond to the piston-cylinder mechanisms 96 which are shown in FIGS. 1 and 7. The cylinders of the mechanisms 196 are pivotally connected to the frame 125 and their pistons are pivotally secured to the front face of the platen 185.

A limit switch 197 is mounted on the clamp 130 in a position to be closed when the upper platen 176 is moved into clamping cooperation with the lower platen 175. This limit switch 197 is in circuit relation with the piston-cylinder mechanisms 196. A foot-actuatable switch (not shown) also is in circuit relation with the piston-cylinder mechanisms 196 and with the piston-cylinder mechanisms 182 and 192. When the foot switch is actuated, the cylinders 182 and 192 are energized to clamp the mat section 101 between the platens of the clamps 130 and 131. This clamping action of the clamp 130 closes the switch 197 to energize the cylinders 196 and separate the clamps. When the foot switch is released, the cylinders 182 and 192 are energized to open the clamps and the cylinders 196 are energized to pivot the clamp 131 back to its clamping position.

In operation a mat section 101, such as illustrated in FIG. 10, is folded in the manner shown in FIG. 11 to bring two opposite edges into alignment. When the apparatus is being used in conjunction with the apparatus of FIGS. 1–8, the unfeathered, longitudinal or side edges 102 of the pulled mat section 101 are folded into alignment.

With the clamps 130 and 131 open and in their clamping position of parallel, spaced adjacency, the aligned opposite edges of the mat section are pushed between the platens of the clamps into engagement with a positioning stop 129. As shown, the stop 129 is a plate secured to the front surface of the plates 185 of the clamp 131 so that it extends upwardly beyond the clamping surface of the platen.

The clamps 130 and 131 are then closed to clamp the mat with a uniform clamping pressure and the clamp 131 is pivotally moved away from the clamp 130. The uniform clamping pressure exerted by the clamps results in the randomly distributed fibers of the mat being pulled apart to uniformly feather the sides 102.

*Apparatus for Pulling Feathered Mat Pads*

Reference is now made to FIGS. 12–17 which illustrate still another embodiment of the invention. As will be made more apparent, this alternative construction is limited to the pulling of pads of relatively small width, and is particularly useful in sub-dividing strip-like mat sections previously pulled with the apparatus of FIGS. 1–8.

The apparatus shown in FIGS. 12–17 is comprised of a frame 225 having a mat supporting bed 226. A feed clamp 229 is slidably connected to the frame for feeding a strip of mat along the bed to a clamp 231. This clamp 231 also is slidably mounted on the frame 225 and is movable toward and away from the front end of the bed.

Figure 17:
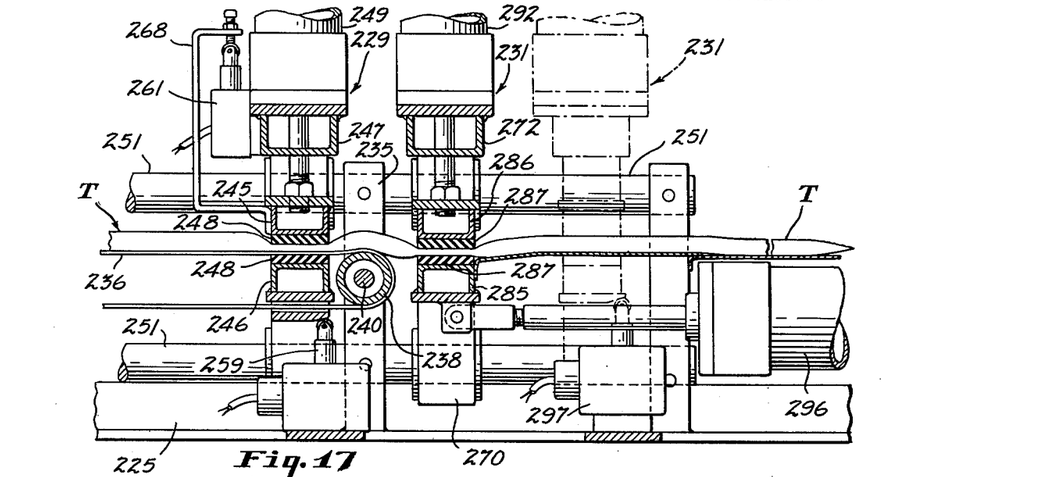
FIGURE 17 is a fragmentary, side elevational view in cross-section of a portion of the apparatus illustrated in FIG. 12.

The general operation of the apparatus consists of moving the feed clamp 229 toward the clamp 231 to position the strip T (FIG. 17) between the platens of the latter clamp. Movement of the feed clamp is stopped when it is in a clamping position of parallel, spaced adjacency to the clamp 231, as shown in FIG. 17. The feed clamp 229 is then held in this position to perform the same clamping function accomplished with the previously described clamps 30 and 130. After the feed clamp has been stopped in the clamping position, the clamp 231 is moved to a second position (shown in dot-dash outline in FIG. 17) in which the clamps are spaced farther apart. Movement of the clamp 231 from its clamping position to its second position is effective to pull apart the strip T between the clamps and to uniformly feather the pulled-apart edges.

Having thus described the general construction and operation of the apparatus, the construction of the bed 226 and the feeding clamp 229 will now be discussed in detail.

In the illustrated form of the apparatus, the bed 226 is formed by an endless belt 236 which has its upper surface in a horizontal plane. The belt 236 is mounted around a pair of belt rollers 237 and 238 which are freely rotatable on shafts 239 and 240, respectively. The ends of each of these shafts are fixed in blocks 235 secured to the sides of the frame 225. The blocks for the shaft 239 may be provided with set screws 241 for adjusting the belt tension.

Figure 15:
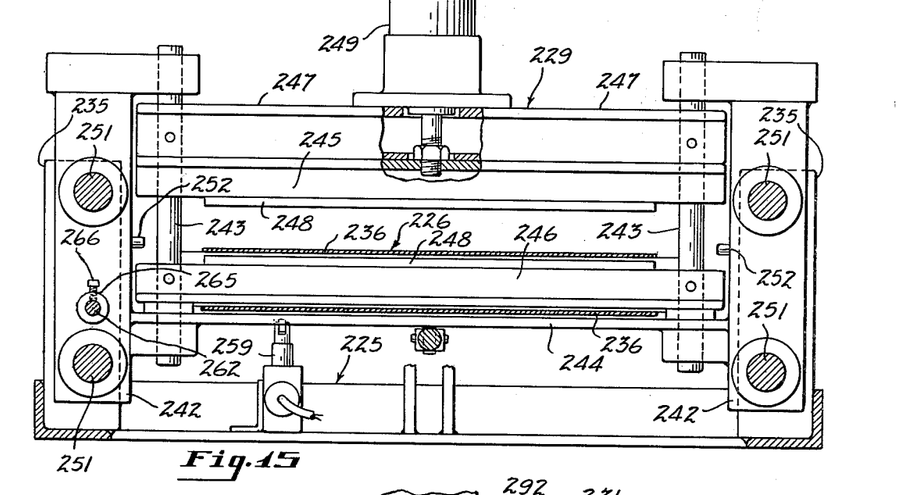
FIGURE 15 is a vertical, cross-sectional view taken along the line 15—15 of FIG. 13.

As shown most clearly in FIG. 15, the feed clamp construction 229 includes an upstanding post 242 at each side of the frame 225, each of which posts supports a vertically movable bar 243. A lower platen 246 extends transversely of the bed 226 between the upper and lower passes of the belt 236 and has its ends fixed to the vertically movable bars 243. The lower platen 246 clampingly cooperates with a relatively movable upper platen 245 which is slidably mounted on the bars 243 above the bed 226. The feed clamp 229 also is shown to include a beam 247 which is coextensive with the upper platen and has its ends fixedly secured to the bars 243 above the upper platen, and a plate 244 which has its ends fixed to the posts 242 below the lower pass of the belt 236. Preferably, the cooperating clamping surfaces of the platens are provided with soft rubber pads 248 so that the glass fibers of the matting strip will not be broken or damaged.

Clamping movement of the upper platen 245 is effected by a double-acting piston-cylinder mechanism 249. As shown, the cylinder of the mechanism 249 is mounted on top of the beam 247, while its piston rod freely extends through a hole in the beam and is fixed to the upper platen. When the piston-cylinder mechanism 249 is actuated, the upper platen 245 is forced downwardly toward the lower platen until it engages the stop pins 252 which are secured to the inner sides of the posts 242. Thereupon the bars 243 and the attached lower platen are raised upwardly to clampingly engage the upper pass of the belt 236 and the supported section of matting. The position of the stop pins 252 is preferably such that downward movement of the upper platen is halted when it engages the top surface of the matting or just prior thereto so that the belt 236 will not be stretched.

Figure 12:
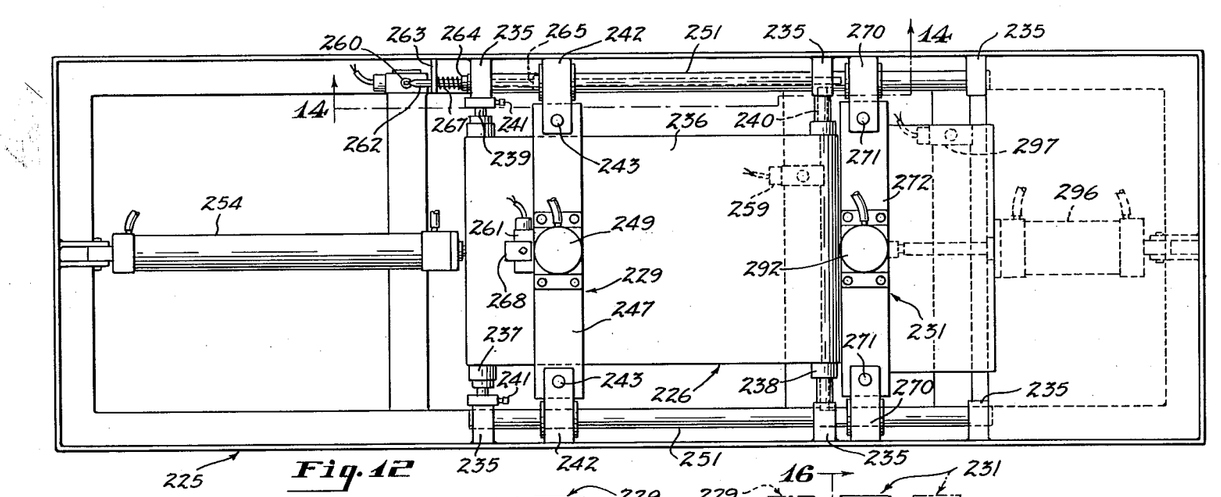
FIGURE 12 is a plan view of still another embodiment of the apparatus comprising the present invention.
Figure 13:
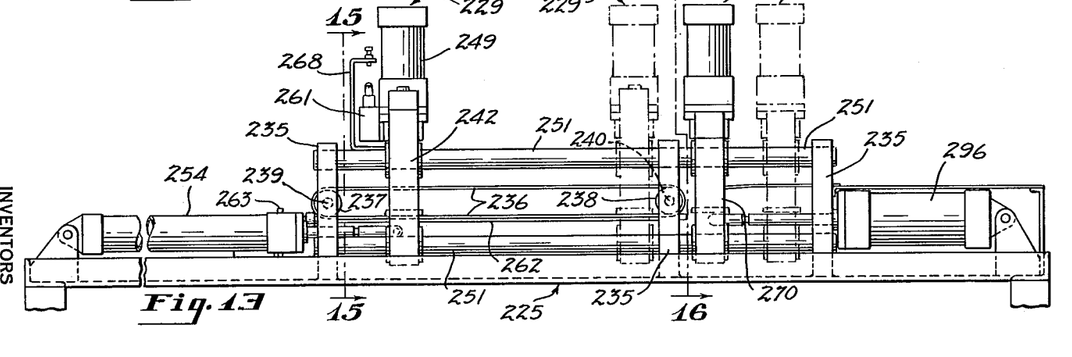
FIGURE 13 is a side elevational view of the apparatus illustrated in FIG. 12.

The posts 242 of the feed clamp 229 are slidably supported on pairs of bars 251 which extend along the sides of the frame 225. Sliding movement of the feed clamp toward and away from the clamp 231 is effected by a double-acting piston-cylinder mechanism 254. As shown in FIGS. 12 and 13, the cylinder of the mechanism 254 is mounted on the rear end of the frame 225 and its piston rod is connected to the plate 244 of the feed clamp.

Figure 14:
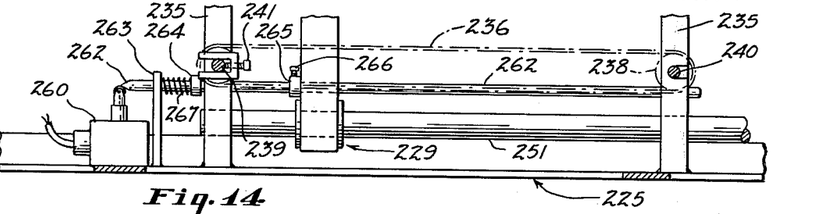
FIGURE 14 is a vertical, cross-sectional view taken along the line 14—14 of FIG. 12.

The operation of the feed clamp 229 is partially controlled by the limit switches 260 and 261. As shown in FIGS. 12 and 14, the switch 260 is mounted on one side of the frame 225 in a position to be closed when the feed clamp is at the rear end of the belt 236. In the illustrated embodiment of the invention, the switch 260 is actuated by a contact bar 262 which is reciprocally mounted through the blocks 235 and a brace 263 at one side of the frame 225. The rear end of the contact bar 262 is provided with a collar 264 between the rearmost block 235 and the brace 263, and a tension spring 267 acts between this collar and the brace 263 to urge the end of the contact bar away from the switch. A second collar 265 is adjustably secured to the contact bar 262 by a set screw 266 in a position to be engaged by the feed clamp so that the bar may be moved against the force of the spring 267 to close the switch 260 when the feed clamp is moved to the rear end of the bed. The switch 261, which is mounted on the beam 247 of the feed clamp 229, is adapted to be closed by an arm 268 secured to the upper platen 245 when it is moved into clamping cooperation with the lower platen 246.

The switch 260 is in circuit relation with the piston-cylinder mechanisms 249 and 254. When this switch is closed by rearward movement of the feed clamp 229, the platens 245 and 246 will be closed to clamp a strip of matting T supported on the bed 226 therebetween and the mechanism 254 will be energized to pull the feed clamp and strip toward the clamp 231. The switch 261 is in parallel with the switch 260 and forms part of a holding circuit so that, when the switch 261 is closed by clamping movement of the feed clamp platens, the mechanisms 249 and 254 will remain energized when the switch 260 is opened by forward movement of the feed clamp.

When the feed clamp reaches its forward position illustrated in FIG. 17, it is held in a fixed position relative to the frame 225 while a pad is pulled from the strip T. Thereupon the platens of the feed clamps are separated to release the strip and the piston-cylinder mechanism 254 is reversely actuated to drive the feed clamp back toward the rear end of the belt 236 until the switch 260 is again closed to initiate a new feeding cycle. By adjusting the position of the collar 265 on the contact bar 262, the length of the feed stroke of the feed clamp can be varied.

Figure 16:
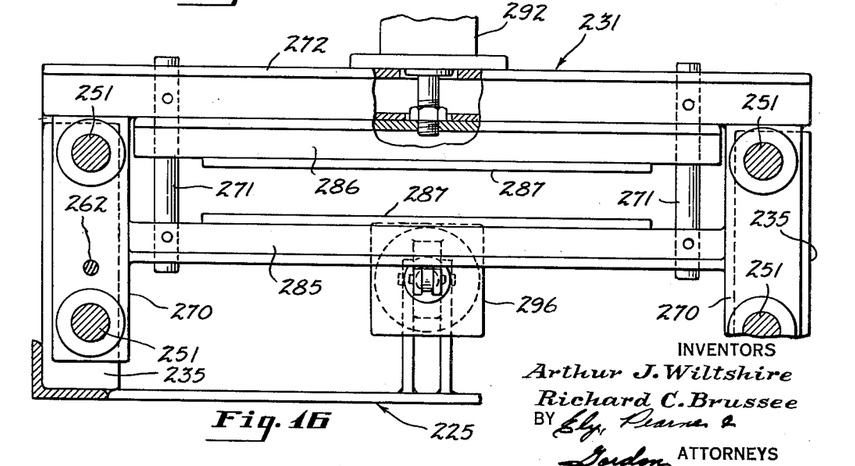
FIGURE 16 is a vertical, cross-sectional view taken along the line 16—16 of FIG. 13.

Reference is made to FIG. 16 which most clearly shows the construction of the clamp 231. This clamp is generally similar to the feed clamp 229 and includes an upstanding post 270 at each side of the frame 225. A lower platen 285 has its ends fixedly secured to intermediate portions of the posts and extends across the frame with its clamping surface substantially coplanar with the top of the belt 236. A cooperating, relatively movable upper platen 286 is slidably mounted on vertical bars 271 which are supported by the lower platen and by a beam 272 which is fixed to the upper ends of the posts 270. The clamping surfaces of the upper and lower platens are preferably provided with soft rubber pads 287.

Movement of the upper platen 286 toward and away from the lower platen 285 is effected by a double-acting piston-cylinder mechanism 292, the cylinder of which is mounted on the beam 272. The piston rod of the mechanism freely extends through a hole in the beam and is secured to the upper platen 286.

As previously described, the clamp 231 is movable toward and away from the forward end of the belt 236. To this end, the posts 270 of the clamp are slidably mounted on the bars 251 in the same manner as the feed clamp 229. A double-acting piston-cylinder mechanism 296 is secured to frame 225 forwardly to the clamp 231. As illustrated in FIG. 17, the piston rod of the mechanism 296 is connected to the lower platen 285 of the clamp 231 so that it may be moved from a position of parallel, spaced adjacency to the clamp 229 to a position (shown in dot-dash outline) in which the clamps are spaced farther apart.

A limit switch 259 is mounted on the frame 225 below the forward end of the belt 236 in a position to be closed by the feed clamp 229 when it reaches the end of its feeding stroke. This limit switch is in circuit relation with the piston-cylinder mechanism 292 which acts to close the platens of the clamp 231 and with the piston-cylinder mechanism 296 which acts to pull the clamps 231 forwardly. A normally closed limit switch 297 is mounted on the frame 225 in a position to be contacted and opened when the clamp 231 is pulled to the dot-dash position shown in FIG. 17. The normally closed switch 297 is in series with the limit switch 261.

In operation the switch 259 is closed when the feed clamp 229 reaches its clamping position of parallel, spaced adjacency to the clamp 231. This causes the platens of the clamp 231 to close to clamp the strip T therebetween and energizes the mechanism 296 to pull the clamp 231 away from the feed clamp. When the switch 297 is contacted and opened, the piston-cylinder mechanisms 249 and 254 are energized to open the platens of the feed clamp 229 and drive back toward the rear of the bed 226. As the rearward travel of the feed clamp commences, the switch 259 is opened. This energizes the piston-cylinder mechanisms 292 and 296 to open the clamp 231 and drive it back to the position shown in FIG. 17. When the clamp 231 is moved away from the switch 297, the switch closes, thereby conditioning the circuit for another cycle of operations.

The combined operation of the elements of the apparatus shown in FIGS. 12–17 is as follows: A fibrous strip T is positioned on the belt 236 so that it extends between the platens of the clamps 229 and 231, the clamps being in the position shown in FIG. 12, and the collar 265 is adjustably positioned on the contact bar 262 to set the length of the feeding stroke. The piston-cylinder mechanisms 249 and 254 are then energized to close the feed clamp 229 and pull it to the clamping position illustrated in FIG. 17.

When the feed clamp 229 reaches its clamping position, the clamp 231 is closed to clamp the strip T and the clamp 231 is pulled forwardly. This forward movement of the clamp 231 is effective to pull apart the strip T between the clamps and to uniformly feather the pulled apart edges of the strip. The length of the pad thus pulled from the strip is, of course, equal to the distance traversed by the feed clamp in its feeding stroke.

After the pad pulling operation is complete, both clamps are opened and returned to their original positions. A new cycle of operations is initiated when the feed clamp closes the switch 260 at the end of its return stroke.

It will be noted that, in the illustrated construction of the foregoing embodiment of the invention, the upper and lower platens of the clamps 229 and 231 have not been respectively formed as simple and cantilever supported beams. This has not been found necessary because the strip pulled by the apparatus is of relatively small width as compared to the strips pulled by the embodiments of FIGS. 1–8 and 11. However, it will be understood that the clamps 229 and 231 may be constructed in a manner similar to the clamps of the previously described embodiments of the invention should it be desired to pull strips of larger widths.

Many other modifications and variations of the preferred embodiments of the invention will be apparent to those skilled in the art in light of the above disclosure. Therefore, it is to be understood that within the scope of the appended claims, the invention may be practiced otherwise than as specifically shown and described herein.

What is claimed is:

1. Apparatus for pulling a feathered edge on a fibrous mat comprising a frame, a first clamp secured to said frame, said first clamp including a first pair of platens relatively movable toward and away from each other, first clamp actuating means connected to said first clamp for moving said first pair of platens toward each other to clamp a first portion of a mat therebetween with a uniform clamping pressure, a second clamp including a second pair of platens relatively movable toward and away from each other, second clamp actuating means connected to said second clamp for moving said second pair of platens toward each other for clamping a second portion of the mat therebetween with a uniform clamping pressure, said second clamp being movably mounted on said frame for movement from a first clamping position in which said portions of the mat are spaced apart with the edges of said first pair of platens parallel to and spaced a distance apart from the adjacent edges of said second pair of platens to a second position in which the edges of said second pair of platens are parallel to and spaced a greater distance apart from the adjacent edges of said first pair of platens and during which movement said adjacent edges are maintained mutually parallel as the distance between said adjacent edges increases, and means connected to said frame and to said second clamp for moving said second clamp to said second position to pull apart the mat held by said clamps and uniformly feather the pulled apart mat edges.

2. Apparatus for pulling a feathered edge on a fibrous mat comprising a frame having a mat supporting bed, a first clamp secured to said frame, said first clamp having a first pair of relatively movable upper and lower platens, first clamp actuating means connected to said first clamp for moving its platens together to clamp a first portion of a mat therebetween with a uniform clamping pressure, a second clamp having a second pair of relatively movable upper and lower platens, second clamp actuating means connected to said second clamp for moving its platens together to clamp a second portion of a mat therebetween with a uniform clamping pressure, said second clamp being movably mounted on said frame for movement between a first clamping position in which said portions of the mat are spaced apart with the edges of said first pair of platens parallel to and spaced a distance apart from the adjacent edges of said second pair of platens to a second position in which the edges of said second pair of platens are parallel to and spaced a greater distance apart from the adjacent edges of said first pair of platens and during which movement said adjacent edges are maintained mutually parallel as the distance between said adjacent edges increases, mat positioning means on said frame for positioning a mat on said bed so that it extends between the upper and lower platens of said clamps when said second clamp is in said first clamping position, and means connected to said frame and said second clamp for moving said second clamp to said second position to pull apart a mat held by said clamps and uniformly feather the pulled apart mat edges.

3. Apparatus for pulling a feathered edge on a fibrous mat comprising a frame having a mat supporting bed, a pair of relatively movable clamps secured to said frame and extending across said bed to clamp a pair of portions of said mat, at least one of said clamps being movable along said bed from a first clamping position in which said portions of the mat are spaced apart with the edges of one of said clamps parallel to and spaced a distance apart from the adjacent edges of the other one of said clamps to a second position in which the edges of said clamps are parallel to each other and spaced a greater distance apart and during which movement said adjacent edges are maintained mutually parallel as the distance between said adjacent edges increases, mat positioning means connected to said frame for positioning a mat to extend between said clamps when in said first clamping position, and means connected to said frame and to at least said one clamp for moving at least said one clamp to said second position to pull apart a mat held by said clamps and uniformly feather the pulled apart mat edges.

4. Apparatus for pulling a feathered edge on a fibrous mat comprising a frame, a pair of relatively movable clamps mounted on said frame for clamping a pair of portions of said mat with uniform clamping pressures, said clamps being movable from a first clamping position in which said portions of the mat are spaced apart with the edges of one of said clamps parallel to and spaced a distance apart from the adjacent edges of the other one of said clamps to a second position in which the edges of said clamps are parallel to each other and spaced a greater distance apart and during which movement said adjacent edges are maintained mutually parallel as the distance between said adjacent edges increases, and means connected to said frame and to at least one of said clamps for separating said clamps to pull apart a mat held thereby and uniformly feather the pulled apart mat edges.

5. Apparatus for pulling a feathered edge on a fibrous mat comprising a frame having a mat supporting bed, a first clamp secured to said frame for camping a first portion of a mat on said bed, a second clamp pivotally connected to said frame adjacent said first clamp for clamping a second portion of a mat, said second clamp being pivotally movable from a first clamping position in which said portions of the mat are spaced apart with the edges of said first clamp parallel to and spaced a distance apart from the adjacent edges of said second clamp to a second position in which the edges of said second clamp are parallel to and spaced a greater distance apart from the adjacent edges of said first clamp and during which pivotal movement said adjacent edges are maintained mutually parallel as the distance between said adjacent edges increases, clamp actuating means connected to said clamps for actuating them when in said first clamping position to apply a uniform clamping pressure to a mat, and means connected to said frame and to said second clamp for pivoting said second clamp to said second position to pull apart a mat held by said clamps and uniformly feather the pulled apart mat edges.

6. Apparatus for pulling a feathered edge on a section of fibrous mat comprising a frame, a pair of relatively movable clamps secured to said frame, each of said clamps including upper and lower beams relatively movable toward and away from each other, said upper and lower beams having substantially identical deflection curves under uniform loading so that when said beams are moved together a uniform clamping pressure will be applied to a pair of portions of a mat positioned between said beams, said clamps being movable from a first clamping position in which said portions of the mat are spaced apart with the edges of one of said pair of beams parallel to and spaced a distance apart from the adjacent edges of the other one of said pair of beams to a second position in which the edges of said beams are parallel to each other and spaced a greater distance apart and during which movement said adjacent edges are maintained mutually parallel as the distance between said adjacent edges increases, and means connected to said frame and to at least one of said clamps for moving at least one of said clamps to said second position to pull apart a mat held by said clamps and uniformly feather the pulled apart mat edges.

7. Apparatus for pulling a feathered edge on a fibrous mat comprising a frame, a first clamp fixedly secured to said frame, a second clamp pivotally connected to said frame, each of said clamps including a pair of beams of substantially equal length which are movable toward and away from each other, said beams having substantially equal deflection curves under uniform loading, means connected to said clamps for moving said beams together under uniform loading to apply a uniform clamping pressure to a pair of portions of a mat positioned between said beams, said second clamp being pivotally movable from a first clamping position in which said portions of the mat are spaced apart with the edges of the beams of said first clamp parallel to and spaced a distance apart from the adjacent edges of the beams of said second clamp to a second position in which the edges of the beams of said second clamp are parallel to and spaced a greater distance apart from the adjacent edges of the beams of said first clamp and during which pivotal movement said adjacent edges are maintained mutually parallel as the distance between said adjacent edges increases, and means connected to said frame and to said second clamp for pivotally moving said second clamp to said second position to pull apart a mat held by said clamps and uniformly feather the pulled apart mat edges.

8. Apparatus for pulling a feathered edge on a fibrous mat comprising a pair of relatively movable clamps secured to said frame, each of said clamps including a simple beam and a cooperating beam of substantially equal length, said cooperating beam being supported only at its center and having an end deflection substantially equal to the center deflection of said simple beam under uniform loading, uniform loading means connected to the ends of each of said simple beams for moving them toward said cooperating beams to apply uniform clamping pressures to a pair of portions of a mat positioned between said beams, said clamps being movable from a first clamping position in which said portions of the mat are spaced apart with the edges of one of said pair of beams parallel to and spaced a distance apart from the adjacent edges of the other one of said pair of beams to a second position in which the edges of said beams are parallel to each other and spaced a greater distance apart and during which movement said adjacent edges are maintained mutually parallel as the distance between said adjacent edges increases, and means connected to said frame and to at least one of said clamps for moving at least one of said clamps to said second position to pull apart a mat held by said clamps and uniformly feather the pulled apart mat edges.

9. Apparatus for pulling a feathered edge on a fibrous mat comprising a frame, a first clamp fixedly secured to said frame, a second clamp pivotally connected to said frame adjacent said first clamp, each of said clamps including a simple upper beam and a lower beam of substantially equal length, said lower beam being connected to said frame only at its center and having an end deflection substantially equal to the center deflection of said simple beam under uniform loading, uniform loading means connected to the ends of said upper beams for drawing them toward said lower beams to apply a uniform clamping pressure to a pair of portions of a mat positioned between said beams, and means connected to said frame and to said second clamp for pivotally moving said second clamp from a first position in which said portions of the mat are spaced apart with the edges of one of said pair of beams parallel to and spaced a distance apart from the adjacent edges of the other one of said pair of beams to a second position in which the edges of said beams are parallel to each other and spaced a greater distance apart and during which pivotal movement said adjacent edges are maintained mutually parallel as the distance between said adjacent edges increases to pull apart a mat held by said clamps and uniformly feather the pulled apart mat edges.

10. Apparatus for pulling a feathered edge on a fibrous mat comprising a frame having a mat supporting bed, a first clamp secured to said frame and extending across said bed, a relatively movable second clamp mounted on said frame, clamp actuating means connected to said frame for actuating said clamps to apply substantially uniform clamping pressure to a pair of portions of a mat positioned between said clamps, said second clamp being mounted for movement from a first clamping position in which said portions of the mat are spaced apart with the edges of said first clamp parallel to and spaced a distance apart from the adjacent edges of said second clamp to a second clamping position in which the edges of said second clamp are parallel to and spaced a greater distance apart from the adjacent edges of said first clamp and during which movement said adjacent edges are maintained mutually parallel as the distance between said adjacent edges increases, means movably connected to said frame for movement toward and away from said relatively movable second clamp for moving a mat in position to be clamped thereby, and means connected to said relatively movable second clamp for moving it to said second position to pull apart a mat held by said clamps and uniformly feather the pulled-apart mat edges.

11. Apparatus for pulling apart a strip of fibrous matting into sections and uniformly feathering the pulled apart edges of said sections comprising a frame having a bed for supporting a strip of matting, clamping means secured to said frame and extending across said bed, actuating means connected to said clamping means for actuating it to clamp and hold a portion of the matting strip in a fixed position relatively to said bed, a relatively movable clamp substantially coextensive with said clamping means, second actuating means connected to said relatively movable clamp for actuating it to clamp another portion of said strip, said relatively movable clamp being connected to said frame for movement from a first clamping position in which said portions of the mat are spaced apart with the edges of said clamping means parallel to and spaced a distance apart from the adjacent edges of said relatively movable clamp to a second position in which the edges of said relatively movable clamp are parallel to and spaced a greater distance apart from the adjacent edges of said clamping means and during which movement said adjacent edges are maintained mutually parallel as the distance between said adjacent edges increases, feeding means slidably connected to said frame for movement along said bed toward and away from said relatively movable clamp, said feeding means including means for engaging the strip and feeding it into position to be clamped by said relatively movable clamp when it is in said first clamping position, and means connected to said frame and to said relatively movable clamp for moving said relatively movable clamp to said second position to pull apart the strip between said clamping means and said relatively movable clamp.

12. Apparatus for pulling apart a strip of fibrous matting into sections and uniformly feathering the pulled apart edges of the sections comprising a frame having a bed for supporting a strip of matting; feeding means slidably connected to said frame for movement toward one end of said bed, said feeding means including a first pair of opposed, relatively movable, platens extending across the bed transversely to its sides, said platens being movable toward each other to clamp a first portion of the matting strip therebetween, and means connected to said frame and said feeding means for moving it toward said one end of said bed to feed said matting strip along said bed; clamping means connected to said frame for clamping and holding a second portion of the strip in a fixed position at said one end of said bed, said clamping means including a second pair of opposed platens extending across said bed for clamping said strip therebetween; and a movable clamp connected to said frame at said one end of said bed, said movable clamp including a third pair of opposed platens substantially coextensive to the platens of said clamping means, means connected to said movable clamp for moving its platens toward each other to clamp a third portion of the strip therebetween, said movable clamp being movable from a first position in which said second and third portions of the mat are spaced apart with the edges of said second pair of platens parallel to and spaced a distance apart from the adjacent edges of said third pair of platens to a second position in which the edges of said third pair of platens are parallel to and spaced a greater distance apart from the adjacent edges of said second pair of platens and during which movement said adjacent edges of said second and third pairs of platens are maintained mutually parallel as the distance between said adjacent edges increases, and means connected to said frame and to said movable clamp for moving said movable clamp to said second position to pull apart the strip between said movable clamp and said clamping means.

13. Apparatus for pulling apart a strip of fibrous matting into sections and uniformly feathering the pulled apart edges of the sections comprising a frame having a bed for supporting a strip of matting; a first clamp fixedly secured to said frame at one end of said bed, said clamp including means for closing and opening it to alternately clamp and release a first portion of a strip of matting on said bed; a second clamp for clamping a second portion of a strip of matting, said second clamp being pivotally mounted on said frame for pivotal movement from a first clamping position in which said portions of the mat are spaced apart with the edges of said first clamp parallel to and spaced a distance from the adjacent edges of said second clamp to a second position in which the edges of said second clamp are parallel to and spaced a greater distance from the adjacent edges of said first clamp and during which pivotal movement said adjacent edges are maintained mutually parallel as the distance between said adjacent edges increases, said second clamp including means for closing it when in said first clamping position and opening it when in said second position, and means connected to said frame and to said second clamp for moving it from said first clamping position to said second position to pull apart a strip of matting held by said clamps and uniformly feather the pulled apart edges of the strip; and a feeding clamp slidably mounted on said frame for movement along said bed toward and away from said first clamp, said feeding clamp including means for closing it when it is spaced from said first clamp and for opening it when it has been moved toward said first clamp, and means connected to said frame and to said feeding clamp for moving it along said bed to feed a strip of matting to said first clamp and said second clamp when said first and second clamps are in said clamping position.

14. The apparatus as claimed in claim 13 wherein said first clamp and said second clamp are each comprised of a stationary lower beam and a relatively movable upper beam of substantially equal length for clamping the matting strip to said lower beam, said beams having substantially equal deflection curves under uniform loading so that the matting strip can be held between the beams with uniform clamping pressure.

15. The apparatus as claimed in claim 14 wherein the upper beams of said first clamp and said second clamp are supported only at their ends and wherein the lower beams are supported only at their centers, the center deflection of said upper beams being equal to the end deflection of said lower beams.

16. The apparatus as claimed in claim 15 wherein said bed is comprised of an endless belt having its upper surface on a horizontal plane, said belt being mounted on freely rotatable belt rollers connected to said frame.

17. The apparatus as claimed in claim 16 wherein said feeding clamp comprises a fixed lower platen extending beneath the upper surface of said belt transversely to sides of said frame and an upper platen substantially coextensive with the lower platen, said upper platen being pivotally connected to said lower platen above said belt for movement toward and away from said lower platen.

18. Apparatus for pulling apart a strip of fibrous matting and uniformly feathering the pulled apart edges of the strip comprising a frame having a bed for supporting a strip of matting; a first clamp slidably connected to said frame for movement from a first position near one end of said bed to a clamping position near the opposite end of said bed, said first clamp including means for closing it in said first position to clamp a first portion of a strip of matting on said bed and for opening it in said clamping position, and means connected to said frame and to said first clamp for moving it from said first position to said clamping position for feeding a strip of matting toward said opposite end of said bed and to thereafter hold said clamp in said clamping position; and a second clamp for clamping a second portion of a strip of matting, said second clamp being slidably connected to said frame for movement from said clamping position in which said portions of the mat are spaced apart with the edges of said first clamp parallel to and spaced a distance from the adjacent edges of said second clamp to a second position in which the edges of said second clamp are parallel to and spaced a greater distance from the adjacent edges of said first clamp and during which movement said adjacent edges are maintained mutually parallel as the distance between said adjacent edges increases, said second clamp including means for closing it when in said clamping position to grip said second portion of matting and opening it in said second position, and means connected to said frame and to said second clamp for moving it from said clamping position to said second position to pull apart a strip of mat held by said first clamp at said clamping position and by said second clamp to uniformly feather the pulled apart edges of the strip.

19. The apparatus as claimed in claim 18 wherein said bed comprises an endless belt having its upper surface in a horizontal plane, said belt being mounted on freely rotatable belt rollers connected to said frame.

20. The apparatus as claimed in claim 19 wherein said first clamp and said second clamp are each comprised of a movable lower platen extending transversely of said frame and a movable upper platen substantially coextensive with said lower platen, said upper and lower platens of each clamp being movable toward each other to clamp said portions of matting therebetween.

References Cited in the file of this patent

UNITED STATES PATENTS

| | | |
|---|---|---|
| 1,688,157 | Sherman | Oct. 16, 1928 |
| 2,637,996 | McKee | May 12, 1953 |
| 2,761,505 | Greiner et al. | Sept. 4, 1956 |